United States Patent Office 3,438,756
Patented Apr. 15, 1969

3,438,756
ANTISMOKE BARIUM PHENATE COMPOSITIONS
Eddie G. Lindstrom, Martinez, Calif., assignor to Chevron Research Company, San Francisco, Calif., a corporation of Delaware
No Drawing. Filed June 27, 1966, Ser. No. 560,907
Int. Cl. C10l 10/02, 1/18
U.S. Cl. 44—51
6 Claims

ABSTRACT OF THE DISCLOSURE

Barium compositions are provided for fuels to reduce smoking comprising a combination of alkylphenol, either bridged or unbridged, with a relatively high molecular weight alkenyl succinic acid and barium carbonate, prepared by carbonation of barium oxide dispersed in the presence of the alkylphenol and alkenyl succinic acid.

---

This invention concerns novel compositions which find use as antismoke additives in fuels. More particularly, this invention concerns novel barium containing compositions having high barium content, which find use as antismoke additives in fuels.

Smoke from diesel engines is undesirable esthetically and also practically, because of the significant contribution to dirt and grime. The exhaust smoke is considered a contribution to air pollution and legal limitations are being placed in sensitive areas on the permissible degree of smoke exhausted by diesel engines. It is found that small amounts of barium in diesel fuels greatly reduce the amount of smoke produced, and, therefore, efforts have been made to employ barium as a hydrocarbon soluble additive to diesel fuels.

In order to have a satisfactory barium fuel additive, it is desirable that the barium be present in relatively high weight percent in comparison to the hydrocarbon solubilizing materials. Moreover, it is also essential for commercial use that the barium containing additive composition be stable indefinitely (long shelf life) and remain dispersed in the hydrocarbon system when brought into contact with water. This latter stability is referred to as water tolerance.

It has now been found that overbased barium alkylphenate compositions containing an alkenyl succinic acid, wherein the barium is present in greater than a 1:1 equivalent ratio to the phenol present, fulfill the requirements of a successful antismoke additive. The significant components of the composition are the alkylphenols, wherein the alkyl group is of at least 8 carbon atoms, and the phenolic groups may be bridged or unbridged; barium as barium phenate, succinate or carbonate; alkenyl succinic acid, wherein the alkenyl group is of at least about 20 carbon atoms; and a hydrocarbon dispersant.

The overbased barium composition is prepared by first combining the phenol, alkenyl succinic acid, a hydrocarbon dispersant, water and optionally a monohydric alcohol of at least about 6 carbon atoms. To this mixture is slowly added at elevated temperatures at least about 1.25 moles of barium oxide per equivalent of phenolic hydroxyl. The temperature is raised until all or almost all of the water is removed, returning any of the monohydric alcohol which has codistilled to the reaction mixture. Then passing $CO_2$ into the reaction mixture until at least 60% of the theoretical equivalents of $CO_2$ have been added. The theoretical equivalents of $CO_2$ equals the total equivalents of barium oxide charged less the equivalents bound to phenolic hydroxide and succinic acid. Since all the carbon dioxide introduced into the reaction mixture may not react, usually excess carbon dioxide is used, rarely exceeding one-fold excess. The monohydric alcohol, if present, and any residual water are then distilled off. A carbon dioxide sparge may be used during or subsequent to the distillation. The product is then filtered and is ready to be used.

The composition will generally contain from about 18 to 30 weight percent barium, more usually from about 19 to 25 weight percent barium. The utilization of barium oxide, i.e., the fraction of barium oxide charged that is incorporated into the product, is generally at least about 90%, and usually about 95%. Therefore, the amount of barium oxide used initially in preparing the additive composition is generally in about 5 to 10 weight percent excess over that desired. The barium is present in the composition primarily as the phenate, carbonate and carboxylate.

The alkylphenol will generally have an alkyl group of at least about 8 carbon atoms and more usually from about 10 to 20 carbon atoms. The alkyl group may be branched or straight chain. Illustrative branched groups may be derived from propylene or isobutylene such as tetrapropenyl, diisobutylene, triisobutylene, tetraisobutylene, pentapropenyl, etc. Illustrative straight chain radicals are pentadecyl, hexadecyl, dodecyl, octadecyl, eicosyl, etc.

As already indicated, the alkylphenols may be bridged with any convenient bridging group, usually a methylenic bridging group. Ordinarily, there will be an average (over the total composition) of from about 1 to 3 alkylphenols per molecule. Therefore, the bridged alkylphenols will for the most part have the following formula:

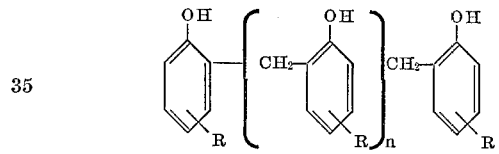

wherein R is an alkyl group of at least about 8 carbon atoms, more usually of from about 10 to 20 carbon atoms and $n$ is an integer of from 0 to 1. For the most part, the R group will be bonded in the meta or para position.

Either the unbridged or bridged alkylphenols may be used or mixtures of the two. Usually, in the preparation of the bridged alkylphenols, some of the monomeric reactant will be present in the product.

The alkenyl succinic acid will usually be of the following formula:

$$R^1CHCO_2H$$
$$\phantom{R^1}|$$
$$\phantom{R^1C}CH_2CO_2H$$

wherein $R^1$ is an aliphatic group of at least about 20 carbon atoms and more usually from about 25 to 125 carbon atoms. The alkenyl group may be straight chain or branched, preferably being branched. It may be derived from natural hydrocarbons or by the polymerization of ethylene, propylene or isobutylene to the desired molecular weight. Illustrative succinic acids are polyisobutenyl succinic acid, polypropenyl succinic acid, triacontenyl succinic acid, etc. The preferred alkenyl groups are branched having at least 1 branch per 4 carbon atoms in the chain, the branch usually being of from 1 to 2 carbon atoms.

Various hydrocarbon dispersants may be used which have boiling points above about 175° C. Oils or diesel fuels may be used which may then be readily combined with the diesel fuel to provide the necessary barium concentration. Oils which may be used include lubricating oils derived from paraffinic base, naphthenic base or mixed base oils, while diesel fuels may be straight run, thermally or catalytically cracked petroleum distillates, alkylates, etc., generally, however, an ASTM D158 distillation in the range of about 325° F. to 775° F. Alternatively, an aromatic hydrocarbon may be used, such as tert.-butyl benzene, cymene, or mixtures of alkylated benzenes containing 9 or more carbon atoms per molecule made by catalytic reforming processes and the like.

Optionally, a monohydric alcohol may be included in the reaction mixture during the preparation of the overbased barium additive. The alcohol will generally be of about 6 to 15 carbon atoms, preferably of from about 8 to 13 carbon atoms. Illustrative alcohols include methyl isobutyl carbinol, 2-ethylhexanol, decyl alcohol and tridecyl alcohol.

In preparing the barium composition, for each part of alkenyl succinic acid will be added from about 3 to 8 parts of alkylphenol, more usually from about 3 to 5 parts of alkylphenol. The hydrocarbon dispersant will usually be present in at least about equal weight to the combined weight of the alkylphenol and alkenyl succinic acid, more usually from about 1 to 2 times the combined weight of the alkylphenol and the succinic acid. The alkanol, if added, will generally be present in from about 3 to 10 weight percent of the composition and more usually from about 4 to 8 weight percent of the composition, while the water will be present in from about 3 to 15 weight percent, more usually from about 5 to 10 weight percent of the reaction mixture composition.

The alkylphenol (bridged or unbridged or mixtures thereof), alkenyl succinic acid, water and optionally the monohydric alcohol are mixed and heated to a temperature in the range of about 50° to 90° C., while barium either as the oxide or hydroxide is added. Usually, at least 1.25 moles of barium will be added per equivalent of phenolic hydroxyl and more usually from about 1.5 to 2.5 moles. That is, from about 18 to 25 weight percent of barium will be present based on the phenol, the succinic acid and the hydrocarbon dispersant. The barium oxide or hydroxide will generally be added incrementally rather than in a single batch. The time for the addition will vary, usually in the range of 15 minutes to 6 hours.

When the addition of the barium has been completed, the temperature is raised to at least about 125° C. and generally about 140° to 160° C. and water taken overhead. Any alkanol which codistills is returned to the reaction mixture.

While maintaining approximately the same temperature, carbon dioxide is introduced. The carbon dioxide is readily absorbed and carbonation is usually continued until absorption of the carbon dioxide gas ceases. This occurs when the theoretical amount of carbon dioxide has been absorbed. Normally, a small excess of carbon dioxide is passed into the reaction mixture, but good products are obtained with as little as ⅔ of the theoretical amount of carbon dioxide. Usually, the addition of carbon dioxide requires from about ½ hour to 4 hours. Once the addition of carbon dioxide has been completed, the temperature is then raised to at least about 160° C. and usually less than 200° C. and all volatile materials removed in vacuo. If desired, a carbon dioxide sparge may be used. When no further material distills, the product is then filtered, ordinarily through a bed of diatomaceous earth, e.g., celite. The product is now ready to be used.

The product composition will generally have from about 15 to 30, more usually from 20 to 28 weight percent alkylphenol, from about 3.5 to 9, more usually 4 to 8 weight percent alkenyl succinic acid, and from about 18 to 30, more usually 19 to 25 weight percent barium. The remainder of the composition will primarily be the hydrocarbonaceous dispersant.

Other chemicals may also be included in the overbased barium composition. Defoamers may be found useful in amounts of 0.001 to 0.1 weight percent of the composition.

The barium composition is used in diesel fuels to provide from about 1 to 20, more usually from about 1 to 10 mm./kg. of barium in the fuel. The compositions prepared by this invention are readily miscible with diesel fuels to form a stable dispersion in the fuels. The barium composition is particularly useful when operating engines under high load, at higher altitudes where atmospheric pressure is lower, or in general with diesel motors which are inefficiently burning the fuel.

The following examples are offered by way of illustration and not by way of limitation.

EXAMPLE I

Into a reaction vessel was introduced 81 g. of alkylphenol, wherein the alkyl groups are tetrapropenyl, 22 g. of a 45 weight percent oil solution of polyisobutenyl succinic acid (approximately 1,000 molecular weight), 94 g. of a Mid-Continent 100 neutral oil, 13 g. of 2-ethylhexanol and 40 ml. of water. To this mixture was slowly added 72 g. of barium oxide with stirring while the temperature was maintained between 60° and 90° C. The temperature was then raised to about 105° C. and the mixture stirred for ½ hour.

Increasing the temperature to 150° C., 30 ml. of water and 5 ml. of 2-ethylhexanol were taken overhead, the latter returned to the reaction mixture. While maintaining the temperature using a 1 mm. inlet tube, carbon dioxide was passed through the mixture for about 1.5 hours, the opaque mixture becoming nearly transparent. The temperature was then raised to 170° C. and the pressure reduced to 20 mm. Hg. A carbon dioxide sparge was employed during the distillation. When no further material distilled, the product was filtered.

Analysis of the product showed 22.5 weight percent barium. Vis. at 100° F. SUS, 2,226; at 210° F. SUS, 120.

Substantially identical results were obtained when polyisobutenyl succinic acids of about 740 and 1,500 molecular weights were substituted for the 1,000 molecular weight polyisobutenyl succinic acid used in the above example.

EXAMPLE II

Following the procedure of Example I, 44 g. of a 45 weight percent solution of polyisobutenyl succinic acid (approximately 1,000 molecular weight) was used, rather than the 22 g. employed in Example I. After workup as described in Example I, analysis of the product showed 19.8 weight percent barium.

EXAMPLE III

Into a reaction vessel was introduced 61 g. of tetrapropenylphenol, 20 g. of a 45 weight percent solution of polyisobutenyl succinic acid (approximately 1,000 molecular weight), 89 g. of a Mid-Continent 100 neutral oil and 20 ml. of water. To this mixture was slowly added 65 g. of barium oxide with stirring while the temperature was maintained between 60° and 90° C.

The temperature was then slowly raised to 130° C. while taking off water overhead. After most of the water had been removed, 12.5 g. of 2-ethylhexanol was added. The reaction product was then carbonated by introducing gaseous carbon dioxide into the mixture until more than the stoichiometric amount of the carbon dioxide had been added and absorption of carbon dioxide had ceased. The temperature was then raised to 170° C. and the pressure reduced to 20 mm. Hg, taking volatile materials overhead. When no further material distilled, the product was filtered. Analysis of the product showed 20.3% barium.

EXAMPLE IV (A) Into a reaction flask was introduced 800 g. of tetrapropenylphenol (2.81 moles), 164 g. of 2-ethylhexanol and 262 ml. of water and the mixture heated to 60° C. To this mixture was added in aliquots 39.4 g. of barium oxide (0.26 mole). The mixture was then stirred for 1 hour at 90° C., followed by cooling to 50° C. and adding 159 g. of a 37% aqueous formaldehyde solution (1.96 moles). The mixture was then stirred for 3 hours at 90° C., followed by removing the volatile materials in vacuo at a pot temperature of 150° C. and a pressure of 15 mm. Hg.

(B) Following the procedure of Example I, 66 g. of the above product was combined with 42 g. of a 45 weight percent solution of polyisobutenyl succinic acid (approximately 1,000 molecular weight), 40 ml. of water, 64 g. of a Mid-Continent 100 neutral oil and 62 g. of barium oxide.

Analysis of the product showed 19.1 weight percent barium.

EXAMPLE V

Into a reaction vessel was introduced 77 g. of tetrapropenylphenol, 13 g. of 2-ethylhexanol and 20 ml. of water, the mixture heated to 60° C. and 4 g. of barium oxide slowly added. After heating at 90° C. for a short time to insure solution of the barium oxide, the mixture was cooled to 40° C. and 11.3 g. of a 37% aqueous formaldehyde solution (0.15 mole) added. The mixture was then stirred at 90° C. for 2 hours.

After cooling the mixture, 15 ml. of water, 94 g. of a Mid-Continent 100 neutral oil, 22 g. of a 45 weight percent solution in oil of polyisobutenyl succinic acid (approximately 1,000 molecular weight) were added, and then 68 g. of barium oxide was slowly added while maintaining the temperature between 60° and 90° C.

The temperature was then raised to about 150° C. and water taken overhead, 5 ml. 2-ethylhexanol distilling being returned to the reaction mixture. After the water had been distilled, 35 g. of gaseous carbon dioxide was slowly added. The temperature was then raised to 170° C. and the pressure slowly reduced to 20 mm. Hg, distilling all volatile materials overhead. When no further material distilled, the product was filtered. Analysis of the product showed 22% barium.

For the most part, the antismoke activity is based solely on the barium present and not on the barium solubilizing agent. The additives of this invention are attractive because of their use of readily available materials, low cost, good physical properties, e.g., clarity, water tolerance, storage stability, fuel miscibility, etc., and high barium content.

To demonstrate that the compositions of this invention have good water tolerance, the following test was carried out. A Number 2 diesel fuel of commercial quality containing 10 mm./kg. of the barium additive is mixed with either 1 weight percent or 10 weight percent of water and then the mixture is emulsified by vigorous stirring for 30 minutes. After about 30 minutes of settling, the organic phase is separated from the aqueous phase and filtered through No. 2 Whatman filter paper and the weight percent of barium determined on the clear, bright diesel fuel. The following table indicates the loss of barium.

TABLE

| Example | Wt. percent loss of Ba | |
|---|---|---|
|  | 1% $H_2O$ | 10% $H_2O$ |
| II | 1.8 | 17. |
| IV | 3 | 9 |
| V | 3.3 | 15.2 |

It is evident from the above results that the compositions of this invention are stable in the presence of water despite the severe conditions of the test.

As will be evident to those skilled in the art, various modifications on this invention can be made or followed, in the light of the foregoing disclosure and discussion, without departing from the spirit or scope of the disclosure or from the scope of the following claims.

I claim:
1. A composition useful as an antismoke additive in diesel fuels consisting essentially of from 15 to 30 weight percent of a methylenic bridged alkylphenol having from 2 to 3 alkylphenols per molecule, wherein the alkyl groups are of from 8–20 carbon atoms, from about 3.5 to 9 weight percent of an alkenylsuccinic acid, wherein the alkenyl group is of from 20 to 125 carbon atoms, from about 18 to 30 weight percent of barium present as carbonate or the salt of other acidic species present in the composition, and the remainder a hydrocarbonaceous medium, wherein said composition is prepared by combining (1) said methylenic bridged alkylphenol; (2) said alkenylsuccinic acid; (3) water, and (4) a hydrocarbon medium, wherein 3 to 8 parts of said methylenic bridged alkylphenol is used per part of said alkenylsuccinic acid, the hydrocarbon medium is present in an amount equal to at least about an equal weight of the alkylphenol and alkenylsuccinic acid and the water is present in about 3 to 15 weight percent of the total composition, heating the mixture to at least 50° C., adding at least about 1.25 moles of barium as the oxide or hydroxide per equivalent of phenolic hydroxyl, heating to a temperature of at least 125° C., and distilling water overhead, and, at a temperature of at least 125° C., introducing at least 10 percent of a stoichiometric amount of carbon dioxide.

2. A composition according to claim 1, wherein the alkyl groups are from about 10 to 20 carbon atoms, the alkenyl group is of from about 25 to 125 carbon atoms, and barium is present in from 19 to 25 weight percent.

3. A composition according to claim 2, wherein the alkenylsuccinic acid is present in from about 4 to 8 weight percent.

4. A diesel fuel composition having in it from about 1 to 20 mm./kg. of barium presented added as a composition according to claim 1.

5. A diesel fuel composition according to claim 4, wherein said barium is present in from 1 to 10 mm./kg.

6. A composition according to claim 1, wherein said barium oxide is added in an amount of 1.5 to 2.5 moles per equivalent of phenolic hydroxyl.

References Cited

UNITED STATES PATENTS

| 3,372,116 | 3/1968 | Meinhardt | 252—39 XR |
| 2,695,910 | 11/1954 | Asseff et al. | 44—70 XR |
| 3,055,829 | 9/1962 | Wiley et al. | 252—40.7 XR |
| 3,271,310 | 9/1966 | Le Suer | 252—39 XR |

DANIEL E. WYMAN, Primary Examiner.

WILLIAM J. SHINE, Assistant Examiner.

U.S. Cl. X.R.

44—57, 70, 78